United States Patent
Lavrik et al.

(10) Patent No.: US 8,079,081 B1
(45) Date of Patent: Dec. 13, 2011

(54) SYSTEMS AND METHODS FOR AUTOMATED LOG EVENT NORMALIZATION USING THREE-STAGED REGULAR EXPRESSIONS

(75) Inventors: Anton Lavrik, St. Petersburg (RU);
Pavel Trakhtman, Houston, TX (US);
Paul Fisher, Conroe, TX (US); Eugene Golovinsky, Houston, TX (US)

(73) Assignee: Alert Logic, Inc., Houston, TX (US)

( * ) Notice: Subject to any disclaimer, the term of this patent is extended or adjusted under 35 U.S.C. 154(b) by 712 days.

(21) Appl. No.: 12/163,733

(22) Filed: Jun. 27, 2008

(51) Int. Cl.
*H04L 29/06* (2006.01)

(52) U.S. Cl. .......................... 726/22; 709/223

(58) Field of Classification Search ............... 726/12, 726/13, 22; 713/168, 176, 178
See application file for complete search history.

(56) References Cited

U.S. PATENT DOCUMENTS

| | | | |
|---|---|---|---|
| 7,599,939 B2 | 10/2009 | DeStefano et al. | |
| 2004/0230798 A1* | 11/2004 | Bleumer | 713/168 |
| 2007/0179986 A1* | 8/2007 | Adam | 707/200 |
| 2007/0240217 A1* | 10/2007 | Tuvell et al. | 726/24 |
| 2007/0283194 A1 | 12/2007 | Villella et al. | |
| 2009/0089252 A1* | 4/2009 | Galitsky et al. | 707/3 |

* cited by examiner

*Primary Examiner* — Gilberto Barron, Jr.
*Assistant Examiner* — Malcolm Cribbs
(74) *Attorney, Agent, or Firm* — Sprinkle IP Law Group

(57) ABSTRACT

Methods and systems for normalizing log messages. Some methods include obtaining a freeform log message from one of many disparate programs. The methods can include determining which program originated the message and, based on that, determining a signature which matches the message. Using the signature, a parsing expression may be determined with which to extract information from a portion of the message. The time from obtaining the message to extracting the information can be about the same for all messages and can be about $1/40,000^{th}$ of a second. In some embodiments, a generic signature of the message may be output. A version of the message may be reconstructed based on the generic signature and information. When more than one message signatures matches the reconstructed message, one of the matching signatures can be adjusted. The parsing expression can be the first of an ordered list of expressions which successfully evaluates the log message.

20 Claims, 6 Drawing Sheets

SYSTEMS AND METHODS FOR AUTOMATED LOG EVENT NORMALIZATION USING THREE-STAGED REGULAR EXPRESSIONS

TECHNICAL FIELD OF THE DESCRIPTION

Embodiments of the disclosure relate generally to management and analysis of computer generated log messages and more particularly to automatic log message processing.

BACKGROUND

Computer systems utilized for business and other systems generate messages which report user access, service errors, and other information about the operation of the systems. These messages are recorded in a log, managed by the computing system and are therefore called log messages. Traditionally log messages are recorded in files on the local file system, or in the case of Syslog enabled systems, can be directed to external storage systems. In some scenarios, computing systems based on Microsoft Windows record log messages to the local file system via the Windows Event Log.

Recent industry and government regulations such as the Payment Card Industry Data Security Standard (PCI DSS), Sarbanes-Oxley Act (SOX), Health Insurance Portability and Accountability Act (HIPAA), and the Gramm-Leach-Bliley Act (GLBA), etc. require that log data be collected, regularly reviewed, and securely archived. To meet the requirements of these regulations, log message files must be archived for up to seven (7) years. For large organizations or organizations with specialized operations, the volume of log messages generated may require storage capacity approaching petabytes (PB) of data. This has generally resulted in significant capital investment, staffing expense and operational complexity necessary to provide secure and reliable storage for the required length of time.

Hardware and software vendors, developers, owners, etc. encode information in their log messages in varying ways. Thus, from the perspective of systems that obtain these varying log messages, the messages are freeform with little, if any, formatting in common. Complicating the situation further, several types of log messages (even from the same vendor) can convey the same or similar information while varying widely in format. Because of the freeform nature of log messages, obtaining meaningful information from the data encoded in the multitude of log messages from even one computer system can require manual review of hundreds, thousands, or more disparate log messages. Manually reviewing such massive quantities of information entails correspondingly massive quantities of labor, time, and effort. Manually correlating data, manually detecting meaningful patterns, manually recognizing incidents, and the like with such massive numbers of log messages require skills, talents, and endurance not readily available to most business organizations.

SUMMARY OF THE DESCRIPTION

Embodiments of the present disclosure provide systems and methods for processing log messages that eliminate, or at least substantially reduce, the shortcomings of prior art systems and methods for processing log messages.

Embodiments provide methods and systems for normalizing log messages. The log messages can originate from a variety of disparate programs and can convey information regarding the originating program. In one embodiment, a method can include obtaining a freeform log message. The method can include determining the originating program based on the freeform log message. A signature can be determined which matches the freeform log message based on the originating program and the freeform log message. A parsing expression can be determined based on the message signature. The parsing expression can be used to parse the freeform log message to extract and output information from the freeform log message One embodiment provides a machine readable medium containing instructions for a method of normalizing log messages. The method can include obtaining a freeform log message. The method can include determining the originating program based on the freeform log message. A signature can be determined which matches the freeform log message based on the originating program and the freeform log message. A parsing expression can be determined based on the message signature. The parsing expression can be used to parse the freeform log message to extract and output information from the freeform log message.

One embodiment provides a system for normalizing log messages. The system can include a processor, an interface, and a machine readable medium in communication with each other. The machine readable medium can contain instructions for a method for normalizing log messages.

Various embodiments allow for faster and more manageable processing of disparate log messages. Embodiments allow for extraction of information from log messages for further processing. Some embodiments process each log message in about the same time as other log messages. With predictable processing times for each log message, some embodiments allow for the normalization of log messages in real time. Some embodiments allow log messages to be normalized, parsed for data, and further processed in a timely fashion.

These, and other, aspects will be better appreciated and understood when considered in conjunction with the following description and the accompanying drawings. The following description, while indicating various embodiments and numerous specific details thereof, is given by way of illustration and not of limitation. Many substitutions, modifications, additions, or rearrangements may be made within the scope of the disclosure, and the disclosure includes all such substitutions, modifications, additions, or rearrangements.

BRIEF DESCRIPTION OF THE FIGURES

A more complete understanding of the disclosure and the advantages thereof may be acquired by referring to the following description, taken in conjunction with the accompanying drawings in which like reference numbers generally indicate like features and wherein.

DETAILED DESCRIPTION

The invention and the various features and advantageous details thereof are explained more fully with reference to the non-limiting embodiments that are illustrated in the accompanying drawings and detailed in the following description. Descriptions of well known starting materials, processing techniques, components and equipment are omitted so as not to unnecessarily obscure the disclosure in detail. Skilled artisans should understand, however, that the detailed description and the specific examples, while disclosing preferred embodiments, are given by way of illustration only and not by way of limitation. Various substitutions, modifications, additions or rearrangements within the scope of the underlying inventive concept(s) will become apparent to those skilled in the art after reading this disclosure.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited to only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like.

Reference is now made in detail to the exemplary embodiments, examples of which are illustrated in the accompanying drawings. Wherever possible, the same reference numbers will be used throughout the drawings to refer to the same or like parts (elements).

Figure 1:
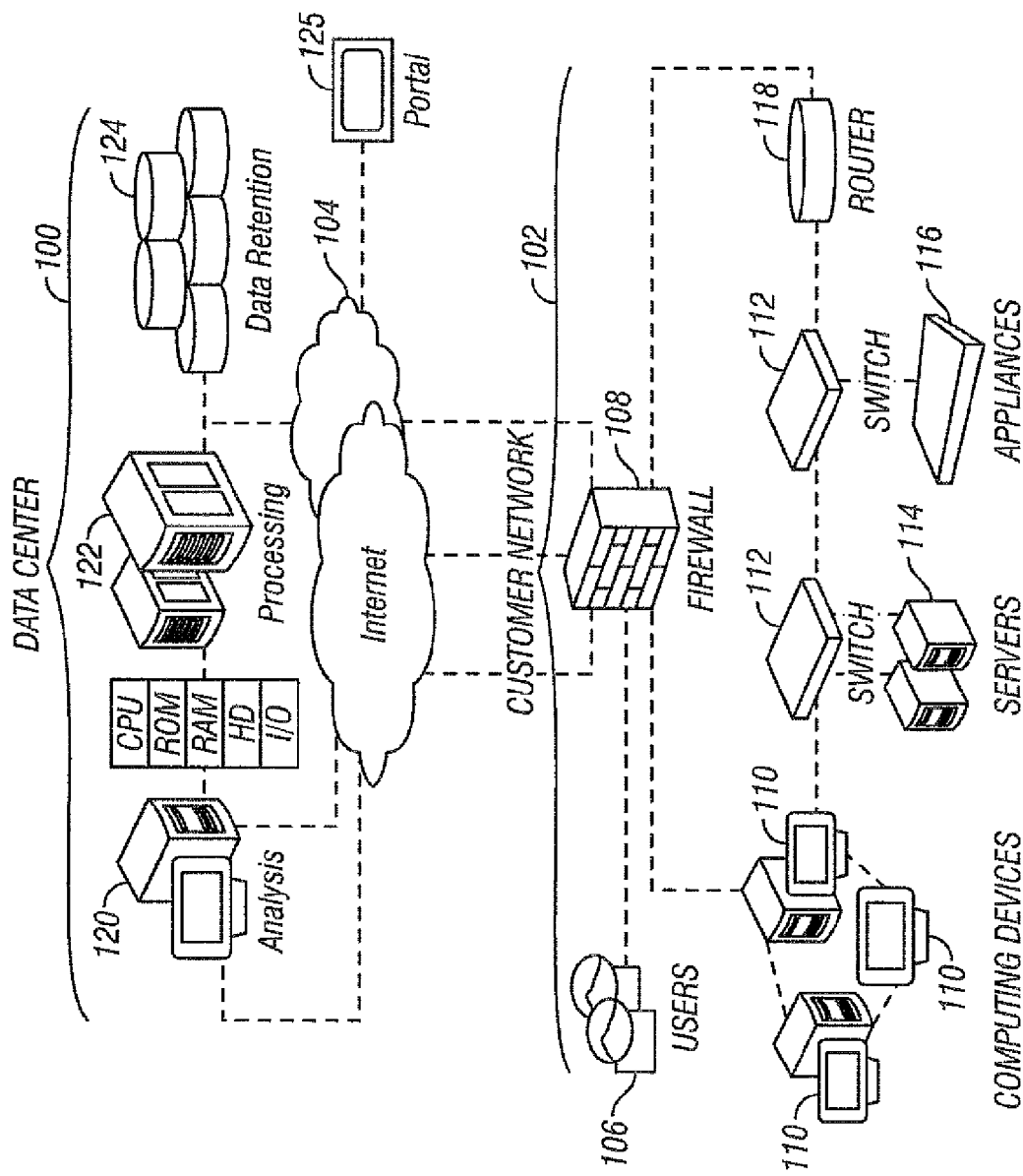
FIG. 1 depicts an architectural diagram of one embodiment of a system for log message processing using a remote internet infrastructure.

FIG. 1 illustrates one embodiment of a system for processing log messages. Within the system, components including, but not limited to, data center 100, network 102, network 104, users 106, firewall 108, computing devices 110, switches 112, servers 114, appliance 116, and router 118 can cooperate to process log messages. As noted, the system includes appliance 116 and data center 100, each coupled to network 104. Other appliances (not shown) may also be coupled to network 102 or network 104. Network 102 may be an intranet, a private network, a WAN, a LAN, etc. Network 104 may be a public network such as the Internet. Firewall 108 may control access to router 118 and computing devices 110. Appliance 116 may be located on network 102 behind firewall 108. Appliance 116 may communicate with devices such as firewall 108, servers 114, computing devices 110, routers 118, and switches 112 on network 102 to collect log messages generated by users 106 or any of the devices. Computing devices 110 may include laptop computers, personal computers, personal digital assistants, cellular phones, etc.

Appliance 116 may be a desktop computer, a laptop computer, a workstation, or nearly any other device capable of receiving, processing, filtering, packetizing, compressing, encrypting, or sending log messages over network 104 to data center 100. In some embodiments, appliance 116 may be an application residing at one or more of the devices located on network 102. Thus, appliance 116 may be an application running on server 114, may have a portion running on firewall 108 and another portion running on router 118, etc.

In one embodiment, appliance 116 can include a central processing unit ("CPU"), read-only memory ("ROM"), random access memory ("RAM"), a hard drive ("HD"), and input/output devices. Read only memory, random access memory, and hard drive memory of appliance 116 can include media that can be read by the central processing unit and other processors or machines. Therefore, each of these types of memories may include a computer-readable medium. These memories may be internal or external to appliance 116.

Data center 100 may include analysis devices 120, processing devices 122, and data retention devices 124 for receiving, processing, and archiving log messages. Analysis devices 120, processing devices 122, and data retention devices 124 can also have a CPU, ROM, RAM, and HD, either collectively or individually. Data center 100 may include portal 125 for access by users 106 via network 104 such that log messages or data associated with the analysis of the log messages may be accessed. In some embodiments, web portal 125 may provide an interface for remote access. In some embodiments remote access may include configuring appliance 116, data retention devices 124, analysis devices 120, and/or processing devices 122. Remote access may include configuring criteria for determining what log messages are stored, how many queues are created, the size of the packets, and the like.

Figure 2:
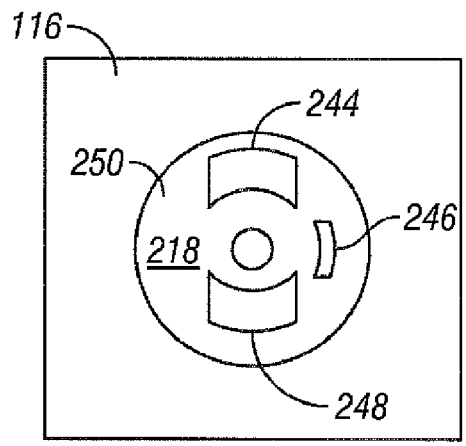
FIG. 2 depicts one embodiment of a storage medium including software code having instructions in accordance with one embodiment.

FIG. 2 illustrates a combination of software code elements 244, 246 and 248 that may be embodied within computer-readable medium 218 on hard drive 250 in appliance 116. Alternatively, the instructions may be stored as software code elements on a DASD array, magnetic tape, floppy diskette, optical storage device, or other computer-readable medium or storage device. In an illustrative embodiment, the computer-readable instructions may be lines of compiled C++, Java, or other language code.

Various software components may reside on a single appliance 116. For example, in some embodiments, a filtering application, a packetizing application, an encryption application, a digital signing application, a memory cache, and log message processing application may be stored in the same appliance 116. A set of computer-executable instructions in an embodiment may be contained on a data storage device, such as hard drive 250 of appliance 116.

During operation, embodiments disclosed herein include methods for providing log message processing. In some embodiments, processing may include archiving, compliance processing, systems management, or other types of processing. Embodiments may offer log message processing through a Software as a Service (SaaS) delivery platform. Appliance 116 may receive log messages collected using the Syslog, MSRPC, or other protocols. Appliance 116 may filter the messages into transmission priority queues, packetize the messages based on the priority. Appliance 116 may securely transmit the packets to data center 100 for processing in accordance with customer desires, requirements, regulatory compliance, etc.

Figure 3:
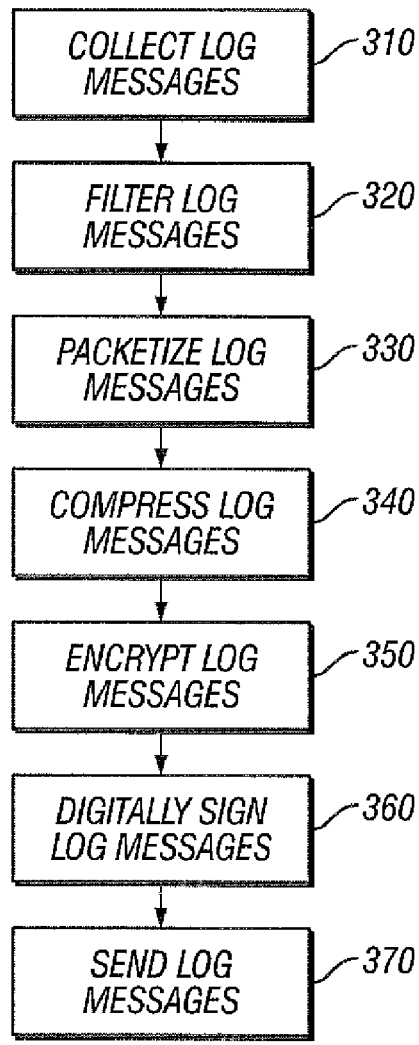
FIG. 3 depicts a flow chart of one embodiment of a method for remote archiving and processing of log messages.

FIG. 3 depicts a flow diagram for one method for processing log messages. In step 310, log messages may be collected from computing devices on network 102 and stored in conjunction with appliance 116. In some embodiments, access to Microsoft Windows log messages may be provided by remotely accessing the Windows Event Log using the Microsoft Remote Procedure Call (MSRPC). In some embodiments, a customer may conFig. firewall 108, servers 114, computing devices 110, routers 118 and switches 112 to send log messages to appliance 116. Appliance 116 may store a set of computer-executable instructions operable to receive log messages from computing devices 110, servers 114, switches 112, firewall 108, users 106, routers 118, or other devices located on network 102. Log messages may be sent according to the syslog protocol. RFC 3164 describes aspects of the syslog protocol. Those skilled in the art will appreciate that collection may be possible by changing the syslog pointers to appliance 116. Appliance 116 may store collected log messages in a buffer, discussed below. In some embodiments, collecting log messages may include translating the log messages using Dynamic Link Libraries (DLLs). U.S. patent application Ser. No. 12/141,209, entitled "Log Message Collection Employing On-Demand Loading of Message Translation Libraries" describes one method for translating log messages and is hereby incorporated by reference in its entirety.

In step 320, appliance 116 may utilize a set of message content rules to filter the log messages into priority queues or discard messages not designated for retention. In some embodiments, three priority queues may be used, although any number of priority queues may be established by a user. The priority queues may be based on users 106, servers 114, computing devices 110, firewall 108, switches 112 or router 118. For example, a log message generated from a particular server 114 may have a higher priority than another server 114. A log message generated by a selected user 106 may be designated a higher priority than a log message generated by another user 106. A log message generated from outside firewall 108 may have a higher priority rating than a log message generated from inside firewall 108. The priority queues may be prioritized as high, medium or low. The priority queues may have a numerical prioritization such as 1-5. Those skilled in the art will appreciate that other prioritization formats may be utilized. The filtered and prioritized log messages may be stored in queues in appliance 116.

In step 330, appliance 116 may packetize the messages from one or more priority queues. Packetization may be based on the bandwidth of the network 104 available for communicating with data center 100 or the packetization algorithm. The bandwidth policy and packetization algorithm may independently affect the size of the packets, or may interact to affect the size of the packets.

A bandwidth transmission policy may be a set of limits specifying the bandwidth limit appliance 116 is permitted to utilize. The bandwidth limit may be specified as a number of bytes per second or some other criterion. In some embodiments, the set of limits may be composed of non-overlapping time frames, with each time frame having an associated bandwidth limit. In some embodiments, a default bandwidth may be in effect when no bandwidth limit has been specified. Thus, if the available bandwidth is high, the packet size may be larger to accommodate more log messages or more packets may be sent. By packetizing the messages based on the available bandwidth, interference with day-to-day operations of the network or devices on the network may be reduced. In an example, Table 1 depicts a sample bandwidth transmission policy. In Table 1, a first (default) bandwidth limit is set at 1500 Kbps, a second bandwidth limit is set at 200 Kbps between 0600-1800 hours, and a third bandwidth limit is set at 700 Kbps between 1800-2100 hours.

TABLE 1

| Default Rate | 1500 | Kbps |
| 0600-1800 hours | 200 | Kbps |
| 1800-2100 hours | 700 | Kbps |

With the effective bandwidth transmission limit in effect, appliance 116 may follow a packetization algorithm to generate packets of log messages for transport. As log messages arrive at appliance 116, they can be sorted into transmission priority queues based on a prioritization policy, such as in step 320. Appliance 116 may utilize a packetization algorithm to select log messages from the various queues based on the priority of the log message, and fill packets to the conFig.d size limit.

Table 2 depicts one embodiment of a packetization algorithm that may be used by appliance 116 to packetize log messages.

TABLE 2

| 1. Select log messages from the highest priority queue available until: | 1.1 Size limit of packet is reached; 1.2 The queue is exhausted; or 1.3 The next log message is outside of the packet time interval. |
| 2. Select log messages from the next lower queue available for the current interval, until: | 2.1 The size limit of the packet is reached; 2.2 The queue is exhausted; or 2.3 The next log message is outside the packet time interval. |
| 3. Repeat the second step until: | 3.1 The size limit of the packet is reached; or 3.2 All queues have been processed. |

In one embodiment, when appliance 116 selects the highest priority queue, a queue may be skipped if the queue was exhausted, or may be skipped on each subsequent execution until the lowest priority queue is exhausted on the last execution of the algorithm, the queue is skipped for a priority-specific time period or the contents of the queue would fill more than half the contents of the size limits of packets.

Embodiments may also allow a user to designate rules for packetizing. For example, a user may establish criteria such that all high priority log messages are packetized and sent from appliance 116 to data center 100 immediately, regardless of bandwidth. A user may establish criteria such that medium priority log messages are sent only during selected hours, or when the bandwidth is at a selected level. A user may establish criteria such that low priority log messages are sent only during selected hours, only when the bandwidth is at its highest level, or some other criteria. Thus, a user is able to designate criteria that enable embodiments to optimize the transmission of information to ensure higher priority messages are received timely, but without decreasing transmission rates (or increasing bandwidth costs) due to the transmission of lower priority messages. It will be apparent that a wide variety of criteria may be utilized by a user to designate these types of rules.

In step 340, appliance 116 may compress the packets. The compression of the log message data may be performed using the bzip2 algorithm [BZIP2. In step 350, appliance 116 may encrypt each packet before sending the packet over network 104. The SHA-256 algorithm is one example of an encryption algorithm which may be used to encrypt such messages. In step 360, appliance 116 may digitally sign the encrypted packet before sending the packet over network 104. The FIPS 186-2 digital signature algorithm is one example of a digital signature algorithm which may be used to digitally sign such messages. Those skilled in the art will appreciate that other compression, encryption and signature algorithms may be used.

Once constructed, in step 370 packets that have been compressed, encrypted and digitally signed may be transmitted to data centers via encrypted transport over a public network, such as the Internet, and processed. In some embodiments, appliance 116 can communicate with data center 100 to send packets of log messages from network 102 to data center 100 using network 104. Communications between appliance 116 and data center 100 can be accomplished using electronic, optical, radio-frequency, or other signals. For example, when a user accesses appliance 116, appliance 116 may convert the signals to a human understandable form when sending a communication to the user and may convert input from a human to appropriate electronic, optical, radio-frequency, or other signals to be used by data center 100. Similarly, when an operator accesses data center 100, data center devices 120, 122, and 124 may convert the signals to a human understandable form when sending a communication to the operator and may convert input from a human to appropriate electronic, optical, radio-frequency, or other signals to be used by appliance 116.

The transmission of packets may be controlled via the appliance in order to limit the amount of network bandwidth utilized, which allows the customer to manage the impact on their network.

Embodiments disclosed herein may satisfy regulatory compliance processing without the storage volume normally associated with archiving log messages. For example, if log messages are retained in response to a statutory requirement, a digital signature may be used to verify that the compressed and encrypted log messages archived in a remote infrastructure are the same as the original log messages. As a result, a user may satisfy the statutory requirement using a fraction of the storage volume.

Figure 4:
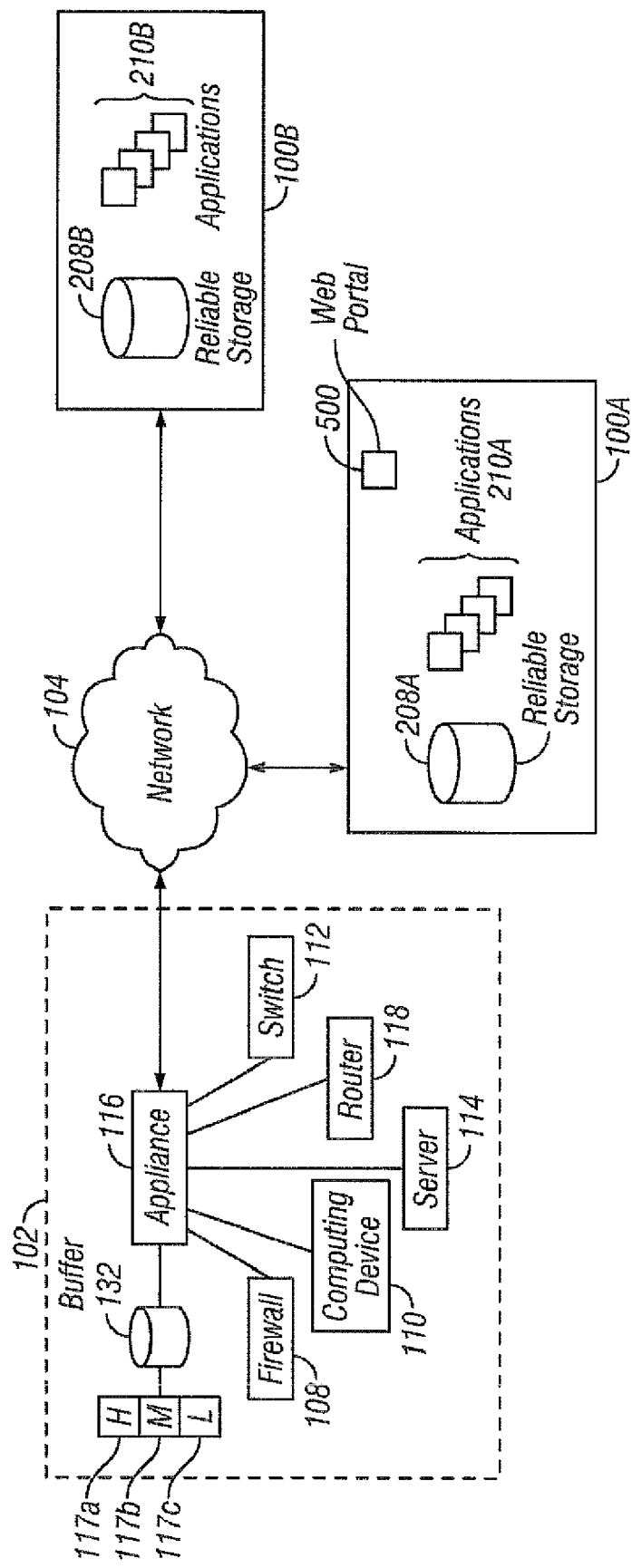
FIG. 4 depicts a block diagram of one embodiment of a system for log message processing using a remote network infrastructure.

FIG. 4 depicts a block diagram of one embodiment of a system for archiving log messages. Appliance 116 on network 102 may communicate with computing devices 110, servers 114, switches 112 and routers 118, each of which may forward log messages to appliance 116. Appliance 116 may filter the log messages and prioritize the log messages received from computing devices 110, servers 114, switches 112, routers 118 and other devices located on network 102 based on user-defined criteria. Examples include, but are not limited to, the type of computing device, the identification (username or password) of a particular user 106 accessing or attempting to access network 102, the time of day, the program or application the user is using or attempting to use, the length of time the program is being used, and what information is being requested. In some embodiments, appliance 116 may store the filtered log messages in transmission priority queues such as queues 117a, 117b and 117c in buffer 132. Buffer 132 or queues 117a, 117b and 117c may be internal or external to appliance 116. In some embodiments, filtering may be based on a program, address or facility that generated the log message.

Appliance 116 may communicate with first data center 100A over network 104 to send packets from appliance 116 to first data center 100A. First data center 100A may receive packets which have been compressed, encrypted or digitally signed and store the packets in reliable storage 208A. First data center 100A may include applications 210A that are useful for analyzing the log messages in accordance with customer processing desires, requirements, protocols, etc. Applications 210A may be stored on analysis devices 120 or processing devices 122 (not shown in FIG. 4). First data center 100A may include applications 210A that may process log message packets to decompress, decrypt, and verify packets and process the data contained in each packet. Examples of processing which may occur at first data center 100A include, but are not limited to, normalizing log messages, extracting data from log messages, full text indexing of log messages, parsing log messages, structured output, data persistence, correlating log message data, and informing and alerting users of various events and processing results.

In some embodiments, full text indexing may be performed real time to enable users to access the log messages. A drawback of prior art archiving is that there may be a delay of days or weeks before the log messages are available for searching. Embodiments disclosed herein allow nearly instantaneous search capability. In some cases, such as compliance processing, this enables a company, medical office, or other entity required to perform compliance processing to quickly access the log messages. Advantageously, if there has been a breach of security, an unauthorized access, or some other event covered by HIPAA, GLB, SOX, or some other regulation, the log messages may be accessible almost instantly, which may be critical to preventing further events.

In some embodiments, parsing may be performed nearly real time. In some embodiments, parsing may be available nearly real-time for high-priority log messages, particularly when the user has designated that log messages be sent immediately to another location.

In some embodiments, structured output processing may be performed on log messages. Structured output may be used to display information about log messages. For example, structured output processing may indicate when certain computing devices are most active, what programs and applications users 106 are accessing, and the like.

In some embodiments, persistence processing may be performed based on the type of information or regulations pertaining to the data. For example, legislation may require information to be retained for seven years. In this situation, the persistence processing may be more robust than persistence processing that may be based on a three year requirement. Embodiments disclosed herein allow users to define criteria for archiving and processing, such that each customer may designate the storage requirements they need, etc. In this way, a user that requires less robust storage requirements may not need to pay for a robust storage system, but may easily change the storage requirements if needed.

In some embodiments, advanced correlation processing may also be performed. For example, appliance 116 may send log messages indicating that the same user 106 has tried to access server 114 from several different computing devices 110 at the same time. Each attempt, when viewed as a stand-alone event, may not be noteworthy. However, advanced correlation processing may determine that the password for user 106 has been compromised and that multiple users 106 attempting to use the same password should be blocked. In some embodiments, advanced correlation processing may be useful for determining when firewall 108 has been breached, when servers 114 are being attacked, or the like.

Alerting may refer to sending a communication based on a log message. First data center 100A may process the log messages in a packet such that information is available for users 106.

Data center 100A having applications 210A for processing may provide many advantages. As an example, if an unauthorized user 106 accessed a patient file stored on server 114, a log message may be generated to indicate that an unauthorized user 106 was accessing the database, a log message may be generated to indicate that user 106 had logged on to a particular computing device 1110, a log message may be generated to indicate that user 106 had accessed server 114, etc. Each log message generated from the event may be filtered as a high priority message and sent immediately to data center 100A. Applications 210A in data center 100A may process the log messages to determine the response. In some embodiments, data center 100A may send an alert to user 106 in network 102 notifying the user that they are not authorized to access the database, send an alert to the supervisor of user 106, send an alert to the computing device 110 upon which unauthorized user 106 is accessing the database, send an alert to server 114, etc. The alert may inform user 106 to stop accessing the database, a set of instructions for computing device 110 to logoff the unauthorized user, a set of instructions to deny further access to server 114, etc.

First data center 100A may send a copy of each compressed, encrypted and digitally signed packet to second data center 100B. Thus, second data center 100B may receive a copy of the packet of log messages that has been packetized, compressed, encrypted or digitally signed and sent to first data center 100A. Second data center 100B may include storage 208B and applications 210B. Applications 210B may perform the same or different processing on packets in second data center 100B that applications 210A perform on packets received in first data center 100A. For example, in some embodiments, data center 100B does not perform alert processing. In some embodiments, data center 100B may perform some alert processing but may not send an alert. In some embodiments, by having redundant or similar functionality, data center 100B may assume the functions of data center 100A in the event data center 100A is unable to function as the primary data center, such as due to a natural disaster or other outside factor, or due to being taken off-line for maintenance or some other internal factor. In some embodiments, data center 100A may be the primary data center for a first network and the secondary (backup) data center 100B for a second network, and data center 100B may be the primary data center for second network and the secondary (backup) data center for first network.

After data center 100B has received a copy of the packet sent from data center 100A, data center 100B may send an acknowledgement message to data center 100A. Upon receipt of the acknowledgment message, data center 100A may forward the message or may send a copy of the message to appliance 116. If first data center 100A does not receive an acknowledgement within a selected time limit, first data center 100A may send another copy of the packet. Upon receipt of an acknowledgement message from data center 100A, appliance 116 may delete the corresponding packet from memory. If appliance 116 does not receive an acknowledgement within a selected time limit, appliance 116 may send another copy of the packet. An advantage is that the storage volume needed for storage of information on network 102 may be minimized based on criteria set up by the customer, and may ensure the log messages are securely stored at a remote Internet infrastructure before deleting the log messages off network 102.

Log messages 119 can indicate that some underlying event associated with one or more of network 102, network 104, users 106, firewall 108, computing devices 110, switches 112, servers 114, appliance 116, router 118, the programs running thereon, etc. may have occurred. For example, one of the foregoing devices 102, 104, 108, 110, 112, 114, 116, etc. 118 may have failed, malfunctioned, began some activity, terminated some activity, powered up, booted, etc. Various programs may have begun executing, terminated, etc. Users 106 may have logged in, logged off, accessed some resource, created, deleted, or modified files, etc. Other parties may have attempted to access network 102, actually accessed network 102, accessed some resource, created, deleted, or modified files, hacked some resource, etc. Some of these events represent normal operation of network 102, some represent abnormal operation of network 102, some represent potentially negligent or malicious activity within or on network 102. Accordingly certain users such as IT personnel, managers, and owners of network 102 may be interested in what events have or may be occurring on network 102. Certain regulations and practices may make it desirable to detect, remediate, report, these, and other, events. Log messages 119 provide one source of data regarding such events and potential events. By examining log messages 119 users 106 can detect, remediate, and report such events. However, to act on such events, it may be desirable to obtain information from log messages 119.

To obtain that information, log messages 119 can be processed. Because log messages 119 can be free form and from disparate computer systems, the time it takes to parse log messages 119 to extract that information (when they can be parsed at all by previously available approaches) can vary widely from log message 119 to log message 119. As a result, post-parse processing of log messages 119 can be forced to wait until parsing is complete. Suspending post-parse processing until parsing completes delays the availability of desired information. Moreover, incoming parsing and post-parse processing tasks can queue up while particular log messages 119 consume often times limited processing resources. Accordingly, previously available parsing and post-parse systems can become inundated with log messages 119 awaiting processing, some times to the point that these systems stall. Without desired information from log messages 119 potential events can go undetected and, therefore, unmitigated with perhaps serious consequences for network 102 and users 106.

Figure 5:
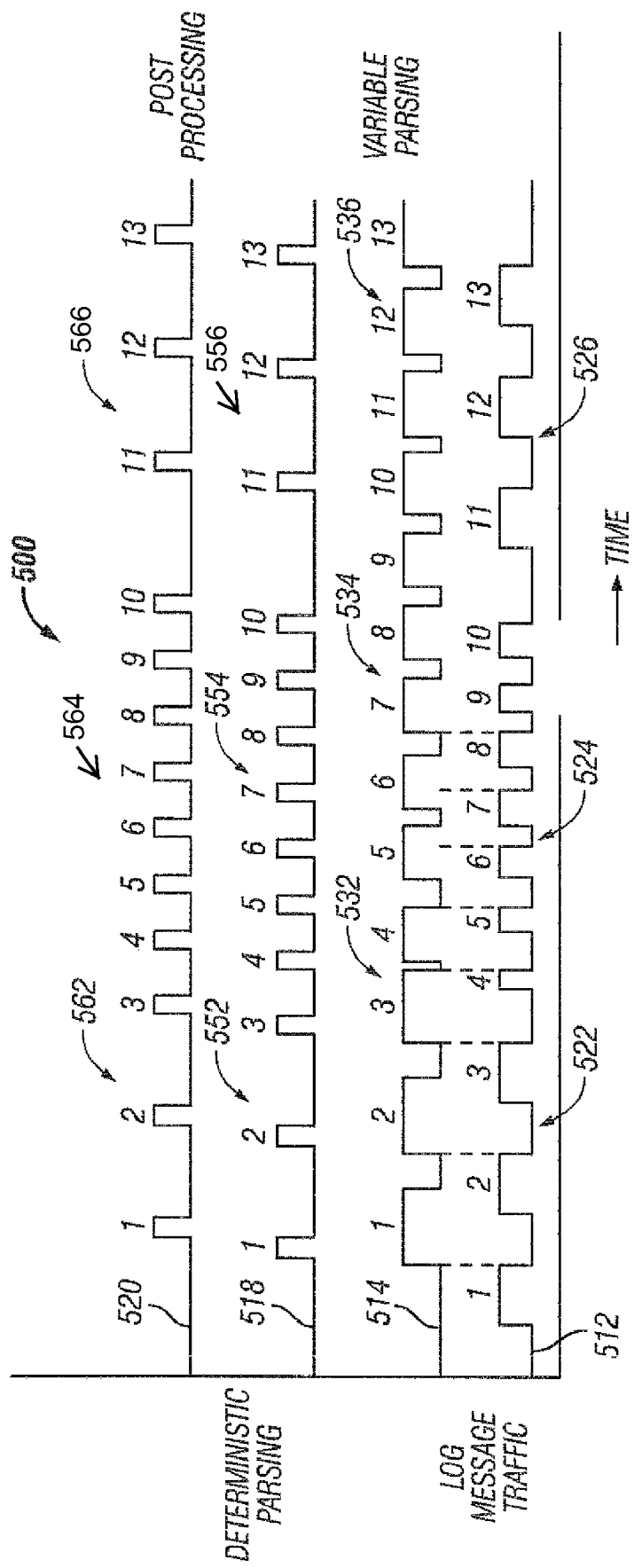
FIG. 5 illustrates a timing diagram of one embodiment.

Various embodiments provide systems and methods for normalizing log messages thereby enabling automated processing of freeform log messages even from disparate computer systems. With reference now to FIG. 5, FIG. 5 is a timing diagram 500 illustrating various scenarios relating to log messages 119 being obtained at a recipient. It is often desired to parse obtained log messages 119 to extract information for further use. Timing diagram 310 shows processing threads 512, 514, 518, and 520. Thread 512 represents a series of log messages 119 arriving at the recipient according to previously available approaches. Thread 512 includes relatively quiet interval 522, relatively busy interval 524, and second relatively quiet interval 526. Each pulse shown by thread 512 can represent log message 119 with the length of the pulses indicating the length of log messages 119. While quite intervals 522 and 526 are shown as including a few lengthy log messages 119 and busy interval 524 is shown with many short log messages 119, any interval could include a mixture of lengthy and short log messages 119 punctuated by gaps of differing lengths there between. In some scenarios, the recipient can parse log messages 119 according to previously available approaches in quiet intervals 522 and 526.

In many scenarios, however, recipients of various log messages 119 may be unable to parse log messages 119 in a timely manner, particularly during busy intervals such as interval 524. Some previously available log message parsing approaches attempt to match incoming log messages 119 against the numerous types of known log messages 119. Because a match can occur after many attempts to match a particular log message 119 against known log message types, parsing a particular log message 119 can require lengthy processing in accordance with previously available approaches. Thread 514 shows that, in some scenarios, parsing of log messages 119 can begin after such log messages 119 are obtained as shown by interval 532 of parsing thread 514. As shown by interval 534, parsing thread 514 can continue parsing each particular log message 119 until parsing of that particular log message 119 is complete. However, in scenarios in which a particular recipient begins to fall behind in parsing incoming log messages 119, parsing thread 514 can be forced to queue incoming log messages 119 as shown by intervals 532, 534, and 536 running together with earlier log messages 119 delaying subsequent log messages 119. Eventually, in such scenarios, parsing thread 514 can fall far enough behind the incoming log message 119 traffic that the results of parsing thread 514 can become increasingly stale. Since post-parse processing depends on the results of parsing thread 514, post-parse processing results become increasingly stale for this reason and because the post-parse processing thread may also have to wait for processing resources while parsing thread 514 continues working its queue.

With continuing reference to FIG. 5, parsing thread 518 according to various embodiments parses incoming log messages 119 such that parsing each log message 119 takes approximately the same time as parsing other log messages 119 and less time than with previously available parsing approaches. Parsing thread 518 can include two-intervals 552, 554, and 556 corresponding to quiet interval 522, busy interval 524, and quiet interval 526 (which are associated with incoming log message thread 512). During quiet interval 552 data center 100 parses each incoming log message 119, awaits another log message 119, processes it, etc. During busy interval 554, data center 100 parses log messages 119 without falling behind or queuing log messages 119 for later processing. Post-parse processing of log messages 119 can begin after data center 100 parses log messages 119 (as shown by comparing parsing thread 518 and post-parse processing thread 520). Processing according to parsing thread 518 and post-parse processing thread 520 can occur rapidly enough that data center 100 finishes both threads 518 and 520 for particular log message 119 before another log message 119 arrives at data center 100. In various embodiments, parsing thread 518 operates rapidly enough that no queuing of log messages 119 results, as illustrated by intervals 562, 564, and 566 remaining separated in time and free of processing delays.

Figure 6:
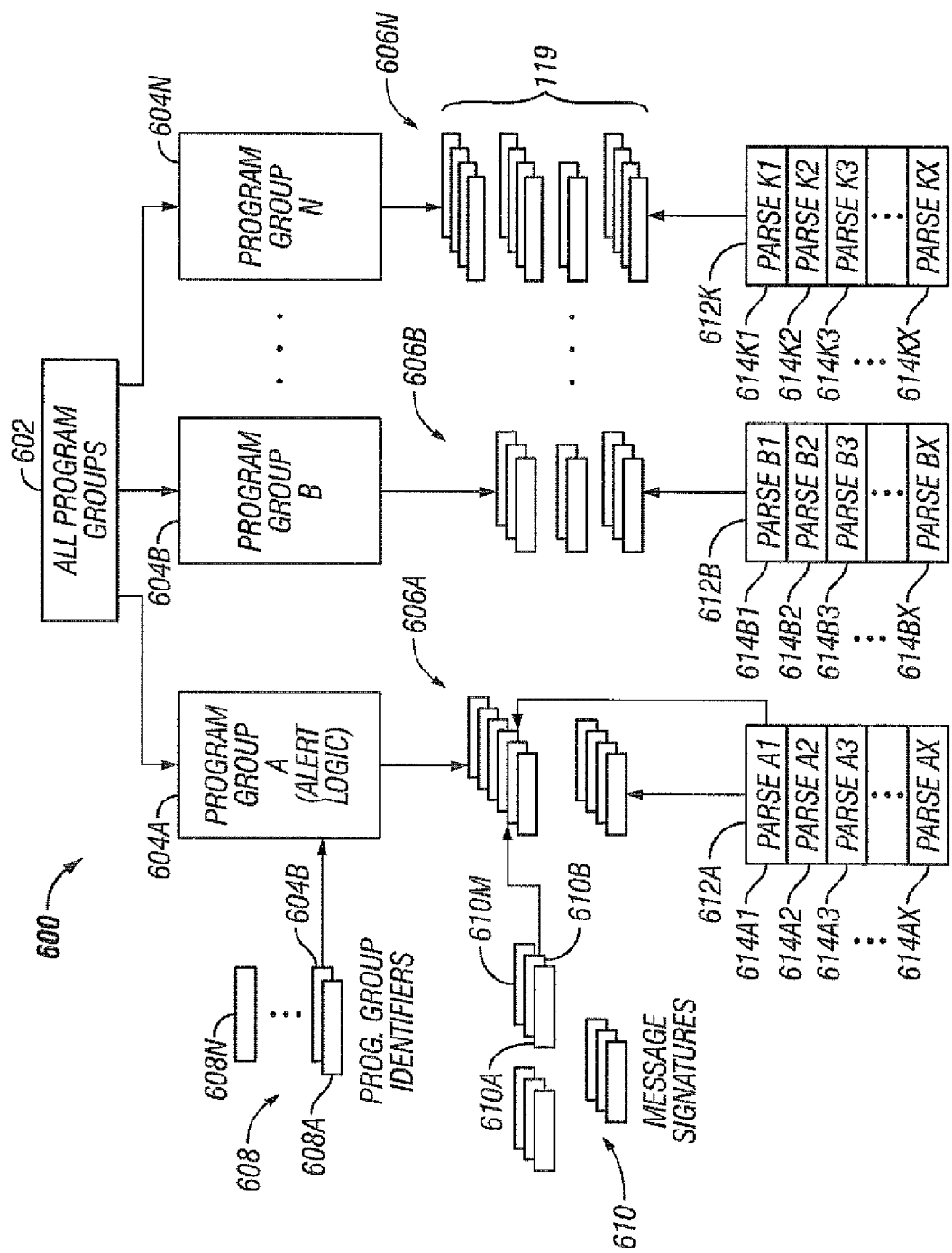
FIG. 6 illustrates an architecture of one embodiment.

FIG. 6 illustrates architecture 600 according to various embodiments. As discussed herein, freeform log messages 119 can be designed by disparate vendors which can impose no overall architecture on the disparate aggregation of possible log messages 119. Architecture 600 of various embodiments can include log messages 119 from all program groups 602. All program groups 602 can include program groups 604A, 604B, . . . and 604N. Architecture 600 can associate sets 606A, 606B, . . . and 606N of log messages 119 with program groups 604 from which log messages 119 therein are known to originate.

Architecture 600 can also include a set of program group identifiers 608 for each program group 604. In some embodiments, architecture 600 includes program group identifiers 608A, 608B, . . . 608M associated with program groups 604A, 604B, . . . 604N. Architecture 600 can include program group identifiers for each program group 604. Program group identifiers 608 can be regular expressions tailored, selected, designed, etc. to partially parse particular log messages 119 to identify indicia of the particular program group 604 which originated the particular log message 119 (and encoded the indicia therein). Since, compared to the multitude of possible log messages 119, originating program group indicia are few in number, data center 100 can quickly attempt to partially parse any particular log message 119 with program group identifiers 608 until it successfully evaluates the program group indicia of the particular log message 119. Whether successful or not in originating identifying program group 604, data center 100 can perform this operation rapidly enough that no queuing is likely to occur.

FIG. 6 illustrates that architecture 600 can include sets of message signatures 610. Message signatures 610 can be regular expressions tailored, selected, designed, etc. to partially parse log messages 119 to identify a portion, or portions, therein which indicate the type of log message 119 which particular log messages 119 may be. Each particular set of message signatures 610 can be associated with a particular set 606 of log messages 119 originating from a particular program group 604. In some embodiments, in which a particular program group 604 encodes more than one indicia into various log messages 119, each message signature 610 can be associated with a particular indicia and program group identifier 608. Since each message signature 610 can be associated with a set 606 of log messages 119, data center 100 can partially parse log messages 119 to identify the type of the particular log message 119 rapidly enough that no queuing is likely even in conjunction with identifying program group 604.

Architecture 600 of FIG. 6 can also include sets 612 of various parsing expressions 614A1-AX, 614B1-BY, . . . and 614K1-614KZ. Each parsing expression set 612 can be associated with a particular message signature 610 and, through it, to a particular program group identifier 608. Parsing expressions 614 can be regular expressions tailored, selected, designed, etc. to partially (or completely) parse log messages 119 of the type with which it is associated (by virtue of being a member of a particular set 612) to extract information from the same. Since, compared to the number of log messages 119, sets 612 include few parsing expressions 614, data center 100 can parse log messages 119, to extract information from log messages 119 rapidly enough that no queuing is likely to occur even in conjunction with identifying program group 604 and message signature 610.

Figure 7:
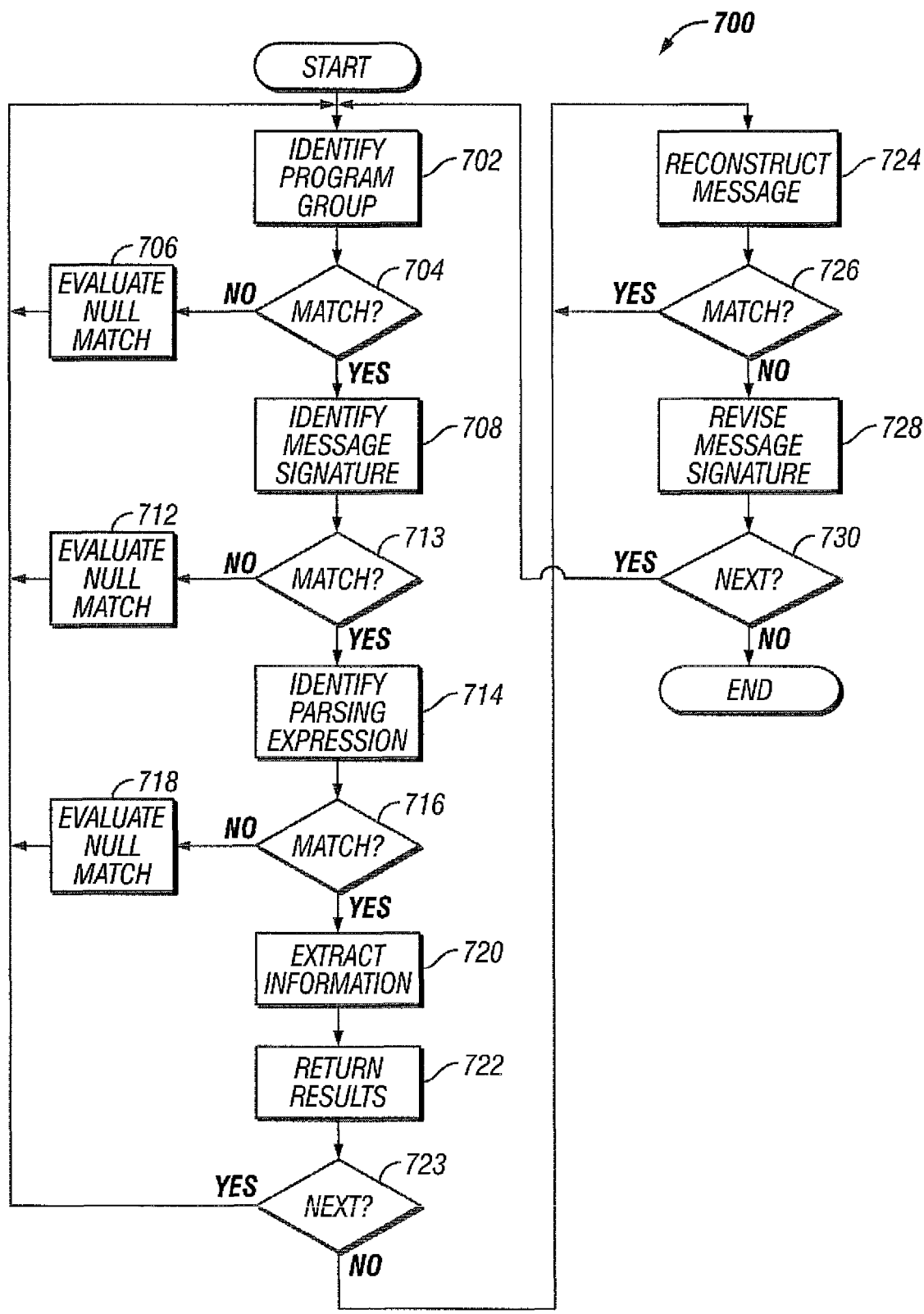
FIG. 7 illustrates a method of one embodiment for normalizing log messages.

With reference now to FIG. 7, method 700 for normalizing, and extracting information from, log messages 119 is illustrated. As noted previously, log messages 119 from network 102 of FIG. 1 may vary greatly in their format, content, etc. In previously available approaches to processing log messages 119, reliance was placed on manual review of various log messages 119. One reason that manual review was relied upon is that no practicable method existed to normalize the various disparate log messages 119 in a consistent, accurate, efficient, and timely manner. Various embodiments provide systems and methods to normalize various disparate log messages 119 in consistent, accurate, efficient, and timely manners. Some embodiments provide systems and methods to extract information from various disparate log messages 119. Method 700, as illustrated by FIG. 7, includes certain steps although many permutations of these, and other steps, are included within the scope of various embodiments.

As illustrated, method 700 can include step 702 in which the identity of program group 604 (of FIG. 6) which originated log message 119 may be determined. In step 702, the header or beginning of log message 119 can be examined to determine whether originating program group 604 encoded an identifier associated with itself in log message 119. Various text parsing techniques such as using regular expressions can be used to detect and identify certain text strings which program vendors may be known to encode in log messages 119 which identify the originating program group. The relatively few origin-indicating text strings desirable for performing step 702 may be used to parse log messages 119 and, when a match with the regular expression occurs, step 702 can output an indicia corresponding to originating program group 604. Known origin-indicating text strings and associated regular expressions can be maintained in a database stored in data center 100 (or in communication therewith).

In some embodiments, regular expressions for parsing the origin-indicating text strings are used one at a time until a match occurs. The first match may be used to indicate originating program group 604 in some embodiments. In some embodiments, all known originating text strings can be compared and matching strings can be retained until all possible matches are evaluated. When more than one match exists, the most specific string may be used to identify program group 604. When no origin indicating strings match log message 119, step 704 can return a null match and allow processing to continue with another log message 119. A null match can cause method 700 to generate a message suggesting that an unrecognized originating program group 604 may have been detected. See step 706. In such scenarios, users can evaluate log message 119 to attempt to determine originating program group 604 and, possibly, update the database of origin-indicating text strings and regular expressions.

In one scenario, a particular log message 119 is determined to have a program identification expression "%((FWSM)|(ASA)|(PIX))" in it associated with Cisco's PIX firewall application. These types of program group identifying expressions, with the program identifiers encoded therein, can be evaluated in step 702 to identify originating program group 604 while requiring little processing time or other resources.

Up to step 704, as shown by FIG. 7, little processing time is likely to have been consumed in identifying originating program group 604 or, in some scenarios, detecting a null match. The technique(s) used to identify originating program group 604 may be optimized with respect to throughput, processing time, or some other metric independently of other operations associated with method 700. Such techniques can be run once per log message 119 and held in suspense until processing of another log message 119 is called for.

When a match occurs between an origin-indicating text string and a log message 119, step 704 shows that processing of the current log message 119 may continue with step 708. For some log messages 119, a match will likely occur because the environment in which log messages 119 originates is either known, or can be characterized statistically, such that many originating program text strings likely to be encountered are known and stored in the database along with their associated regular expressions. In one scenario, an estimated 40% of messages originate from a Linux program group 604, 30% from a Cisco program group 604, and another 30% from a Microsoft program group 604. Some log messages 119 in the current scenario can be expected to result in a null match although even known systems can encode unrecognized originating program text strings into log messages 119. In many scenarios, using the few expressions associated with step 702 will either identify originating program group 604 or generate a null match rapidly enough that no queuing is likely.

Knowing originating program group 604 allows a reduction in the number of message types that might be considered in step 708 to further narrow the set of log messages 119 that might match the current log message 119. Each program group 604 is likely to originate log messages 119 which, while likely different in both format and content, can convey similar data. Every log message 119 from program groups 604 other than the program group 604 identified in step 702 can therefore be excluded from further consideration except, possibly, during validation of matching results discussed with reference to steps 724, 726, 728, and 730. A greatly reduced number of message types can therefore remain for further consideration in further identifying current log message 119 in step 708. In some embodiments, step 702 passes to step 708 the subset of message types remaining for further consideration or an indicia thereof.

In step 708, one possible technique for further identifying log message 119, includes parsing log message 119 with a regular expression which can be termed a "message signature". For each known program group 604, it is possible to store in the database a compilation of message signatures 610 corresponding to the types of messages each program group 604 is recognized as generating. For a particular program group, a particular number of message signatures 610 might be known to exist. Message signatures 610 can correspond to portions of log messages 119. The log message 119 portions need not be continuous, or even consistent, between message types. Only a portion of the current log message 119 need be parsed with message signatures 610 although entire log message 119 could be parsed with various message signatures 610.

For a given message signature 610, it is possible to have different corresponding log messages 119. In some embodiments, the current log message 119 can be compared to each message signature 610 one by one to determine which message signature 610 particular log messages 119 match. The first message signature 610 which matches a particular log message 119 can denote message signature 610 of that particular log message 119. In some embodiments, however, all message signatures 610 can be compared with a particular log message 119. The results can be retained, and when multiple matches occur, the most specific matching message signature 610 can be selected to indicate a match. The occurrence of more than one matching message signature 610 can indicate the possible desirability of further refining one, or more, of matching message signatures 610. When a single match occurs or a particular message signature 610 is selected for further processing, step 708 may pass an indicia of matching message signature 610; the ordered list (or set) of parsing expressions 614 to be considered for extracting normalized data from the log message 119; or combinations thereof to step 714. In one scenario, message signature 610 designed to identify log messages 119 conveying the occurrence of a Cisco PIX ICMP Inbound Traffic Blocked log event, could be written as follows:

-3-106014: Deny inbound icmp src {f}:{ip} dst.

Processing per steps 702, 704, 708, and 713 can occur rapidly enough that no queuing is likely. Some embodiments provide log message 119 analysis tools which can use message signatures 610 for the analyses which they can perform.

Step 712 shows that should no match occur, another log message 119 may be considered. Step 712 allows for generating a message indicative of a null match. Step 712 can allow for investigating the existence of a potentially new message type, its definition, and its inclusion in the database when no match occurs. When a match occurs between message signatures 610 and current log message 119, processing may continue with step 714. In step 714, matching message signature 610 can be used to associate a set 612 of one or more parsing expressions 614 with current log message 119. Set 612 can be an ordered listing with a user selected order reflecting user desires to identify certain types of log messages 119 rapidly.

In step 714 of FIG. 7, parsing expressions 614 which can extract information from current log message 119 can be identified. Set 612 of parsing expressions 614 passed from step 708 of some embodiments can be applied to the current log message 119 until one, or more, parsing expressions 614 evaluate log message 119. In some embodiments, the term "evaluate log message 119" can mean to extract information from log message 119. In some embodiments, the first parsing expression 614 to evaluate successfully can be selected as parsing expression 614 to be used to extract information from current log message 119. In some embodiments, when more than one parsing expression 614 evaluates successfully, a particular parsing expression 614 (such as parsing expression 614 which extracts the most information or particular information items from log message 119) can be selected for parsing log message 119. Multiple successful parsing expressions 614, of some embodiments, can indicate the possible desirability of refining set 612 of parsing expressions 614. Step 714 can use regular expressions as parsing expressions 614 and can be optimized for evaluating log messages 119 with various parsing techniques.

When no parsing expression 614 evaluates log message 119, step 716 can pass control to step 718. Step 718 can allow a message to be generated regarding the null match. In some embodiments, step 718 can allow for developing new parsing expressions 614 to be associated with log messages 119 of the type associated with message signature 610 (which was identified during step 708). When at least one parsing expression 614 successfully evaluates current log message 119, step 716 shows that processing may continue with step 720.

Step 720 shows that using one, or more, successful parsing expressions 614 identified in step 714, information can be extracted from current log message 119. In some embodiments, the extracted information can include token/value pairs. The extracted information can be presented to a user, can be stored for subsequent processing, or can be further processed immediately. In some embodiments, parsing expressions 614 can be evaluated in the order in which they occur in set 612. Extracted information can be stored, presented, processed, etc. in the order of extraction per the ordered list of parsing expressions. Some parsing expressions 614 have an associated list of tokens which they can extract from log messages 119. When a particular parsing expression 614 evaluates log message 119, the result can be a set of token types and associated values. In one scenario, parsing expression 614:

(^%*)%{f-}-3-106014: Deny inbound icmp src {f}:{ip} dst {f}:{ip}\
(type {n}, code {n}\)

can extract token types:
TEXT, CISCO_PRODUCT_ID, SRC_INTERFACE, SRC_IP_ADDR, DST_INTERFACE, DST_IP_ADDR, ICMP_MESS_TYPE, ICMP_MESS_CODE The ordered list of token types resulting from a parsing operation can be referred to as a derived message signature which, as the term implies, can be derived from log message 119 itself. Extracting token types can normalize disparate log messages 119 so that, in some embodiments, similar information in otherwise disparate log messages 119 can be processed in similar manners, thereby increasing throughput, efficiency, etc. of subsequent processes. At step 722, method 700 can output the token/value pairs, the ordered list of token/value pairs, the derived message signature, indicia of the derived message signature, or various combinations thereof.

Scenarios 1 and 2 below illustrate how method 700 can operate to parse various log messages 119.

Scenario 1: Cisco Fix 'Deny IP Due to Land Attack' Log Event

1. The parser can apply known program regular expression to the log event.

In case of the Cisco PIX log events, the program expression is: "%((FWSM)|(ASA)|(PIX))-"

2. When parser matched Cisco PIX program regular expression, it proceeds to attempt to match a specific matching regular expression which would indicate event's derived signature id and its parsing regular expression.

The matching regular expression can be: "-2-106017: Deny IP due to Land Attack from {ip} to"

3. Once the log event was successfully matched and its derived signature identified, the universal parser uses parsing regular expression to extract tokens from the log event.

In our example the parsing regular expression is: "([^%]*)%{f-}-2-106017: Deny IP due to Land Attack from {ip} to {ip}" and it extracts the following tokens: CISCO_PRODUCT_ID, SRC_IP_ADDR, DST_IP_ADDR.

In the current scenario, a data center 100 available from Alert Logic, Inc. of Houston Tex. can use a rule such as:

```
<?xml version="1.0" encoding="utf-8"?>
<!DOCTYPE EventType SYSTEM " . . . /event_types.dtd"
[ ]>
<EventType enabled="yes">
   <Name>Cisco PIX IP Traffic Blocked (Land Attack)</Name>
   <Parent name="Traffic Denied by Firewall"/>
   <SubSignature id="62"/>
   <Matching>
      <EventExample>%PIX-2-106017: Deny IP due to Land Attack from 167.160.241.245 to 192.168.20.10</EventExample>
      <EventExample>Jul 03 2007 11:49:08%PIX-2-106017: Deny IP due to Land Attack from 167.160.241.245 to 192.168.20.10</EventExample>
      <RegExpMatch>-2-106017: Deny IP due to Land Attack from {ip} to
   </RegExpMatch>
   </Matching>
   <Parsing>
      <RegExpParse>([^%]*)%{f-}-2-106017: Deny IP due to Land Attack from {ip} to {ip}</RegExpParse>
      <Tokens>
         <Token type="TEXT"/>
         <Token type="CISCO_PRODUCT_ID"/>
         <Token type="SRC_IP_ADDR" display="yes"/>
         <Token type="DST_IP_ADDR" display="yes"/>
      </Tokens>
      <EventTemplate>%0%%%0-2-106017: Deny IP due to Land Attack from %1 to %2</EventTemplate>
   </Parsing>
</EventType>
```

Parser Output: Log event received—%PIX-2-106017: Deny IP due to Land Attack from 167.160.241.245 to 192.168.20.10

Derived signature id—62

Tokens: CISCO_PRODUCT_ID=PIX, SRC_IP_ADDR=167.160.241.245, DST_IP_ADDR=192.168.20.10

Scenario 2: Windows 2003 'Local Group Member Added (Security Enabled)' log event
1. Universal parser applies known program regular expression to the log event.
   In case of the Windows 2003 server log events, the program expression is: "^MSWinEventLog: MicrosoftWindowsServer2003"
2. When parser matched Windows 2003 server program regular expression, it proceeds to attempt to match a specific matching regular expression which would indicate event's derived signature id and its parsing regular expression.
   In our example the matching regular expression is: "Success Audit {f} Account Management Security Enabled .+Group Member Added: Member Name:"
3. Once the log event was successfully matched and its derived signature identified, the universal parser can use parsing regular expression to extract tokens from the log event.
   The parsing regular expression can be: "MSWinEventLog: MicrosoftWindowsServer2003[^ ]* {n} {f} {n} ([^ ]+) {n} {f} {f} {f} Success Audit {f} Account Management {f:}: Member Name: (.*) Member ID: {f} Target Account Name: (.*) Target Domain: (.*) Target Account ID: {f} Caller User Name: (.*) Caller Domain: (.*) Caller Logon ID: {f} Privileges: (.*) {n}" and it extracts the following tokens: WIN_LOG_TYPE, WIN_EVENT_CODE, WIN_LOG_TYPE, USER_NAME, HOST_NAME, WIN_EVENT_ACTION, GROUP_MEMBER_NAME, GROUP_MEMBER_ID, TARGET_GROUP, DOMAIN, LOGON_ID, CALLER_USER_NAME, CALLER_DOMAIN, CALLER_LOGON_ID, PRIVILEGES, LASSO_EVENT_ID
   In the current scenario, a data center 100 available from Alert Logic, Inc. of Houston Tex. can use a rule such as:
   <!DOCTYPE EventType SYSTEM " . . . /event_types.dtd" [ ]>
   <EventType enabled="yes">
     <Name>Windows 2003 Local Group Member Added (Security
   Enabled)</Name>
     <Parent name="Account Modification"/>
     <SubSignature id="197"/>
     <Matching>
       <EventExample>MSWinEventLog: Microsoft WindowsServer2003 0 Security 12170 Fri Mar 30 13:24: 48 2007 636 Security Unknown User N/A Success Audit LMS Account Management Security Enabled Local Group Member Added: Member Name:— Member ID: %{S-1-5-21-1064284903-1158651535-1039537359-1044} Target Account Name: Administrators Target Domain: Builtin Target Account ID: %{S-1-5-32-544} Caller User Name: liyv Caller Domain: LMS Caller Logon ID: (0x0,0x1035606) Privileges:—1489</EventExample>
   <!—<RegExpMatch>Success Audit {f} Account Management {f:}:
   Member Name:</RegExpMatch>—>
     <RegExpMatch>Success Audit {f} Account Management Security Enabled .+ Group Member Added: Member Name:</RegExpMatch>
     </Matching>
     <Parsing>
       <RegExpParse>MSWinEventLog: Microsoft WindowsServer2003[^ ]* {n} {f} {n} ([^ ]+) {n} {f} {f} {f} Success Audit {f} Account Management {f:}: Member Name: (.*) Member ID: {f} Target Account Name: (.*) Target Domain: (.*) Target Account ID: {f} Caller User Name: (.*) Caller Domain: (.*) Caller Logon ID: {f} Privileges: (.*) {n}</RegExpParse>
         <Token type="TEXT"/>
         <Token type="WIN_LOG_TYPE"/>
         <Token type="TEXT"/>
         <Token type="TIME"/>
         <Token type="WIN_EVENT_CODE"/>
         <Token type="WIN_LOG_TYPE"/>
         <Token type="USER_NAME"/>
         <Token type="TEXT"/>
         <Token type="HOST_NAME" display="yes"/>
         <Token type="WIN_EVENT_ACTION" display="yes"/>
         <Token type="GROUP_MEMBER_NAME" display="yes"/>
         <Token type="GROUP_MEMBER_ID"/>
         <Token type="TARGET_GROUP" display="yes"/>
         <Token type="DOMAIN"/>
         <Token type="LOGON_ID"/>
         <Token type="CALLER_USER_NAME" display="yes"/>
         <Token type="CALLER_DOMAIN"/>
         <Token type="CALLER_LOGON_ID"/>
         <Token type="PRIVILEGES"/>
         <Token type="LASSO_EVENT_ID"/>
       <EventTemplate>MSWinEventLog: MicrosoftWindowsServer2003 %0 %0 %0 %0 %1 %2 %3 %4 Success Audit %5 Account Management %6: Member Name: %7 Member ID: %8 Target Account Name: %9 Target Domain: %9 Target Account ID: % Caller User Name: % 11 Caller Domain: %12 Caller Logon ID: %13 Privileges: %14
   %15</EventTemplate>
     </Parsing>
   </EventType>
Parser Output: Log event received—MSWinEventLog: MicrosoftWindowsServer2003 0 Security 12170 Fri Mar 30 13:24:48 2007 636 Security Unknown User N/A Success Audit LMS Account Management Security Enabled Local Group Member Added: Member Name:—Member ID: %{S-1-5-21-1064284903-1158651535-1039537359-1044} Target Account Name: Administrators Target Domain: Builtin Target Account ID: %{S-1-5-32-544} Caller User Name: liyv Caller Domain: LMS Caller Logon ID: (0x0,0x1035606) Privileges:—1489
   Derived signature id—197
   Tokens: WIN_LOG_TYPE=Security, WIN_EVENT_CODE=636, WIN_LOG_TYPE=Unknown User, USER_NAME=N/A, HOST_NAME=LMS, WIN_EVENT_ACTION=Security Enabled Local Group Member Added, GROUP_MEMBER_NAME=-, GROUP_MEMBER_ID=%{S-1-5-21-1064284903-1158651535-1039537359-1044}, TARGET_GROUP=Administrators, DOMAIN=Builtin, LOGON_ID=%{S-1-5-32-544}, CALLER_USER_NAME=liyv, CALLER_DOMAIN=LMS, CALLER_LOGON_ID=(0x0, 0x1035606), PRIVILEGES=-, LASSO_EVENT_ID=1489
   Step 723 shows that once a particular log message 119 has been processed, method 700 may return to step 702 to process another log message 119. Method 700 can do so if new log message 119 arrives at data center 100, method 700 is being used to evaluate archived log messages 119, etc. If desired, step 723 can pass control to step 724 to validate the results of method 700 (up to step 720).

Validation of the results of step 720 can occur in real time, off line, at times when processing resources are available, etc. Validation can begin with an attempt to reconstruct message signature 610 associated with original log message(s) 119 using the derived message signature and the extracted token/value pairs. See step 724. In step 726, reconstructed log message signature(s) can be compared to various original message signatures 610. If the reconstructed message signature matches one message signature 610, step 726 can return control to step 724 if it is desired to validate more log messages 119. If the reconstructed message signature matches more than one message signature 610, step 726 may pass control to step 728. Since message signatures 610 can be arranged in a hierarchy organized by message type, multiple matches can indicate the possible desirability of revising one or more matching message signatures 610. In some embodiments, step 728 allows for one or more message signatures 610 to be made more specific or otherwise altered. Such revisions can reduce the number of future collisions, as well as resolve collisions in which more than one message signature 610 matches a reconstructed message signature. At step 730, method 700 may continue by validating another reconstructed message signature (at sep 724); parsing another log message 119 (at step 702); exit, etc.

Some advantages of embodiments include the ability of method 700 to process various log messages 119 in about the same time as other log messages 119. In part, this can occur because program group identification (step 702), message signature identification (step 708), parsing expression identification (step 714), and information extraction (step 720) operate on select portions of log messages 119 and consider only select subsets of possible matches during each step. Further, these processes may be optimized for corresponding portions of method 700. One result from such embodiments can be that processing times from beginning of method 700 to extracting information becomes nearly deterministic with most variations tending to shorten processing time (as when a null match occurs in one of the steps).

Although embodiments have been described in detail herein, it should be understood that the description is by way of example only and is not to be construed in a limiting sense. It is to be further understood, therefore, that numerous changes in the details of the embodiments and additional embodiments will be apparent, and may be made by, persons of ordinary skill in the art having reference to this description. It is contemplated that all such changes and additional embodiments are within scope of the claims below and their legal equivalents.

What is claimed is:

1. A method of processing log messages, the method comprising:
   at a data center computer:
     at a first stage, partially parsing a freeform log message to identify a program group from which the freeform log message is originated;
     at a second stage, partially parsing the freeform log message to identify at type of the freeform log message which is associated with a message signature which, in turn, is associated with the program group from which the freeform log message is originated;
     determining a parsing expression based on the message signature;
     at a third stage, partially or completely parsing at least a portion of the freeform log message using the parsing expression to extract information from the freeform log message; and
     outputting the extracted information.

2. The method of claim 1 wherein a time to extract the information is about the same for any of the freeform log messages.

3. The method of claim 2 wherein the time is about 1/40,000 of a second.

4. The method of claim 1 further comprising outputting a generic signature of the freeform log message.

5. The method of claim 4 further comprising:
   reconstructing a version of the freeform log message based on the generic signature and the extracted information;
   comparing the reconstructed version of the log message to a plurality of message signatures; and
   when more than one message signature matches the reconstructed version of the log message, adjusting at least one of the matching message signatures.

6. The method of claim 1 wherein the parsing expression is one of an ordered list of parsing expressions associated with the message signature and the determining the parsing expression further comprises evaluating each of the parsing expressions in the order of the ordered list and using the first parsing expression that successfully evaluates for the parsing a portion of the freeform log message.

7. The method of claim 1 wherein the extracted information includes one or more token type, value pairs.

8. A non-transitory computer readable medium carrying instructions for processing log messages which when executed by a machine cause the machine to:
   partially parse a freeform log message to identify a program group from which the freeform log message is originated;
   partially parse the freeform log message to identify a type of the freeform log message which is associated with a message signature which, in turn, is associated with the program group from which the freeform log message is originated;
   determine a parsing expression based on the message signature;
   partially or completely parse at least a portion of the freeform log message using the parsing expression to extract information from the freeform log message; and
   output the extracted information.

9. The non-transitory computer readable medium of claim 8, wherein a time to extract the information is about the same for any of the freeform log messages.

10. The non-transitory computer readable medium of claim 9, wherein the time is about 1/40,000 of a second.

11. The non-transitory computer readable medium of claim 8, wherein the instructions further comprise instructions which when executed cause the machine to output a generic signature of the freeform log message.

12. The non-transitory computer readable medium of claim 11, wherein the instructions further comprise instructions which when executed cause the machine to:
   reconstruct a version of the freeform log message based on the generic signature and the extracted information;
   compare the reconstructed version of the log message to a plurality of message signatures; and
   when more than one message signature matches the reconstructed version of the log message, adjust at least one of the matching message signatures.

13. The non-transitory computer readable medium of claim 8, wherein the parsing expression is one of an ordered list of parsing expressions associated with the message signature and the instructions which cause the machine to determine the parsing expression further comprise instructions which cause the machine to evaluate each of the parsing expressions in the order of the ordered list and use the first parsing expression that successfully evaluates for parsing a portion of the freeform log message.

14. The non-transitory computer readable medium of claim 8, wherein the extracted information includes one or more token type, value pairs.

15. A system for processing log messages comprising:
a processor;
an interface; and
a machine readable medium, the processor, the interface, and the machine readable medium being in communication with each other, the machine readable medium carrying instructions for processing log messages which when executed by the processor cause the processor to:
partially parse a freeform log message to identify a program group from which the freeform log message is originated;
partially parse the freeform log message to identify a type of the freeform loq message which is associated with a message signature which, in turn, is associated with the program group from which the freeform log message is originated;
determine a parsing expression based on the message signature;
partially or completely parse at least a portion of the freeform log message using the parsing expression to extract information from the freeform log message; and
output the extracted information.

16. The system of claim 15 wherein a time to extract the information is about the same for any of the freeform log messages.

17. The system of claim 16 wherein the time is about $1/40,000$ of a second.

18. The system of claim 15 wherein the instructions further comprise instructions which when executed cause the processor to output a generic signature of the freeform log message.

19. The system of claim 18 wherein the instructions further comprise instructions which when executed cause the processor to:
reconstruct a version of the freeform log message based on the generic signature and the extracted information;
compare the reconstructed version of the log message to a plurality of message signatures; and
when more than one message signature matches the reconstructed version of the log message, adjust at least one of the matching message signatures.

20. The system of claim 19 wherein the parsing expression is one of an ordered list of parsing expressions associated with the message signature and the instructions which cause the processor to determine the parsing expression further comprise instructions which cause the machine to evaluate each of the parsing expressions in the order of the ordered list and use the first parsing expression that successfully evaluates for parsing a portion of the freeform log message.

* * * * *

UNITED STATES PATENT AND TRADEMARK OFFICE
CERTIFICATE OF CORRECTION

| | | |
|---|---|---|
| PATENT NO. | : 8,079,081 B1 | |
| APPLICATION NO. | : 12/163733 | |
| DATED | : December 13, 2011 | |
| INVENTOR(S) | : Anton Lavrik et al. | |

It is certified that error appears in the above-identified patent and that said Letters Patent is hereby corrected as shown below:

At Column 19, line 27, delete "sep" and insert --step--.

Signed and Sealed this
Twenty-eighth Day of February, 2012

David J. Kappos
*Director of the United States Patent and Trademark Office*